United States Patent [19]
Wickersheim et al.

[11] 3,833,862
[45] Sept. 3, 1974

[54] LASER DEVICES AND COMPOSITIONS

[75] Inventors: Kenneth A. Wickersheim; Robert A. Buchanan, both of Palo Alto, Calif.

[73] Assignee: Lockheed Aircraft Corporation, Burbank, Calif.

[22] Filed: May 22, 1970

[21] Appl. No.: 39,805

[52] U.S. Cl. ................... 331/94.5 F, 252/301.4 S
[51] Int. Cl. ........................... C09k 1/14, H01s 3/16
[58] Field of Search .............. 252/301.4 R, 301.4 S; 331/94.5

[56] References Cited
UNITED STATES PATENTS

| | | | |
|---|---|---|---|
| 3,418,246 | 12/1968 | Royce | 252/301.4 S |
| 3,418,247 | 12/1968 | Yocom | 252/301.4 S |
| 3,427,566 | 2/1969 | Hoskins et al. | 252/301.4 R |
| 3,496,482 | 2/1970 | Hoskins et al. | 252/301.4 R |
| 3,503,006 | 3/1970 | Hoskins et al. | 252/301.4 R |

*Primary Examiner*—Oscar R. Vertiz
*Assistant Examiner*—J. Cooper
*Attorney, Agent, or Firm*—George C. Sullivan; Richard H. Bryer

[57] ABSTRACT

This invention relates to laser devices utilizing single crystals of an oxysulfide material as the active medium. More particularly, the host material is an oxysulfide of lanthanum, yttrium, gadolinium or lutetium and the activator ion is neodymium.

6 Claims, 4 Drawing Figures

KENNETH A. WICKERSHEIM
ROBERT A. BUCHANAN
INVENTOR.

LASER DEVICES AND COMPOSITIONS

BACKGROUND OF THE INVENTION

The laser is a device for generating coherent radiation in the optical (visible, ultraviolet or infrared) wavelength range. It consists of an active medium, wherein a number of energy states can exist, within an optical cavity formed by two mirrors. The active elements, atoms or ions, of the ideal laser medium possess at least three energy states and preferably at least four, one of these normally being the ground state of the system. By suitably pumping the system by, for example, incoherent radiation from a lamp, the atoms or ions can be excited to their excited energy states. The system then relaxes nonradiatively to that excited state from which laser emission is to occur. At low pump powers a fluorescent transition would then normally occur, in a three-level system, to the ground state of the system or, in a four-level system, to another state somewhat above the ground state. Ideally the energy separation of the two energy levels between which fluorescence or laser action occurs would fall in a useful energy range. The optical radiation emitted will correspond in photon energy to the energy separation of the initial and final states of the optical transition.

Pumping redistributes the population of the system among the various available energy states. At sufficiently high pump power levels, inversion of populations can be achieved - that is the emitting state can have an excess population compared with the final state to which the fluorescent transition occurs. Under this condition it is possible for the spontaneous fluorescent emission of some excited ions to stimulate the emission from other excited ions leading, via repeated reflections within the cavity, to generation and amplification of traveling waves of light. The radiation so produced is coherent, the atoms or ions having been stimulated to emit radiation in phase with each other at the desired wavelength. Coherent radiation "leaking" through the partially reflective mirrors of the optical cavity forms the output laser beam.

The useful characteristics of lasers are: the intensity of the light generated, the coherence of the radiation, the narrow beams produced, the extreme monochromaticity of the laser radiation or, in some instances, the frequency stability of the light signal generated. Lasers are now being used in a wide variety of applications. High power pulsed lasers are used in radar systems and in battlefield target illumination systems as well as for welding, drilling and otherwise heating, melting or vaporizing materials. Continuous wave lasers are used in stable optical signal sources, in precision alignment and measuring devices and in optical data storage and transmission systems.

Many types of lasers now exist. A variety of lasers utilize a gaseous medium in which individual atoms of the gas are excited either by *rf* or *dc* electric fields or currents. Lasers using a fluorescent organic liquid as the active medium have also been demonstrated. Solid state lasers using semiconductors wherein pumping is done by electric currents and wherein the laser emission corresponds to the radiative recombination of electrons and holes in the semiconductor have been invented. In probably the largest and most useful class of solid state lasers, a laser rod is fabricated from a crystalline or glassy material, typically insulating in nature, the medium containing a small percentage of paramagnetic ions. These ions are pumped optically to their excited states. These excited ions then generate the desired laser radiation in the process of returning to their equilibrium state.

Within this major class of solid state lasers several useful laser materials are now known. Some of the most useful lasers of this class utilize the rare earth, neodymium, as the paramagnetic activator ion. It is found that several lasers of this type generate near infrared radiation in the vicinity of 1.06 microns at room temperature with good efficiency and with low threshold power required, the pumping power being provided either by a tungsten lamp or some other source whose output radiation matches well the visible and near infrared absorption bands of the neodymium ion. Certain neodymium-activated lasers are also useful in generating very high peak powers when operated in a pulsed or Q-switched mode.

The two most successful neodymium-activated lasers discovered to date are the neodymium-glass laser and the neodymium-YAG (yttrium aluminum garnet) laser. Despite the usefulness of these two types of lasers, certain problems remain. Good thermal conductivity is desired since otherwise during laser operation heating of the laser rod produces optical inhomogeneities and losses which limit the laser performance. The thermal conductivity of the glass laser however is very poor. Fluorescent line widths are large for neodymium in glass and laser thresholds are correspondingly high. YAG has a problem in that the amount of neodymium which can be incorporated into the yttrium aluminum garnet crystal structure is limited because of the large size of the neodymium ion. As the concentration of neodymium in yttrium aluminum garnet is raised, it becomes more and more difficult to grow single crystals of good size, homogeneity and general optical quality.

In view of the drawbacks of the prior art materials, the development of new laser materials, particularly neodymium-containing materials is desirable. However, while neodymium is known to be a useful laser activator in a few restricted hosts, there is no way to predict a priori a host material in which neodymium will be efficient as an activator; that is a neodymium-containing material which will have the requisite thermal conductivity, increased ease of incorporation of larger neodymium concentrations than permitted by the prior art, low thresholds and increased optical efficiency as compared to the prior art.

SUMMARY OF THE INVENTION

Briefly, in accordance with the invention, there is described a laser device consisting of a solid rod fabricated from an optical quality single crystal of a rare earth oxysulfide composition containing neodymium. This device is uniquely suitable for the generation of near infrared radiation, either continuously or in pulses, with high efficiency and low threshold powers as compared with other useful laser materials of this general type.

The use of oxysulfide as the host material for neodymium is unexpected in view of the art since such single crystals have not been grown heretofore.

The neodymium ion, in these oxysulfide crystals, exhibits exceptionally intense absorption in the near infrared and visible pumping bands of the ion, the pumping absorption being several times greater than YAG activated with the same percentage of neodymium. For example, for one percent neodymium in lanthanum oxysulfide pumped by radiation from a tungsten lamp, the useful pumping absorption is three to four times greater than for one percent neodymium in YAG. In addition to the pumping of neodymium via its own absorption bands in the visible and near infrared, it is found possible to pump neodymium via ultraviolet absorption in the oxysulfide host itself. This further enhances the pumping of the laser when a broadly-emitting light source such as a Xenon lamp is used.

Neodymium in the oxysulfides also exhibits an exceptionally large cross section for the primary laser transition. In a comparative measurement, the transition cross section for the 1.076 micron transition in lanthanum oxysulfide containing one percent neodymium was found to be approximately 2.5 times larger than that of the 1.06 micron line transition in YAG containing one percent neodymium. The line width for this transition is as small as that of neodymium in YAG and far smaller than that in neodymium-glass lasers. The major portion of the fluorescent emission from neodymium in lanthanum oxysulfide corresponds to emission at the desired laser frequency, approximately 1.076 microns. Thus energy is not wasted on competing transitions as in neodymium-YAG. All of these features contribute to the exceptional performance of the laser device of the invention, yielding a net advantage in increased efficiency and reduced threshold power.

In addition to its generally superior performance characteristics, this material further obviates some of the aforementioned difficulties encountered with other neodymium-activated lasers. The thermal conductivity of the oxysulfide crystals in substantially larger than neodymium-glass lasers leading to advantages for both cw (continuous wave) and pulsed operation in that it provides better cooling of the laser rod, reducing thermal stresses, thermal birefringence and thermal lensing effects, all of which increase losses and limit laser output power and efficiency. The thermal conductivity of the oxysulfide crystals is comparable to that of yttrium aluminum garnet.

Further, the crystal structure of the rare earth oxysulfides is itself unique in that all rare earth oxysulfides have the same structure regardless of rare earth ion size. Thus, unlike the majority of other rare earth compounds including those of the aluminum garnet family, any composition of mixed rare-earth oxysulfides can be grown in this desired structure without either phase change or the production of separate phases. Thus, any concentration of neodymium can be introduced into the oxysulfide crystals without unusual difficulty of crystal growth and without degradation of the crystals produced.

It has been determined that there are four basic host oxysulfide compositions which have the properties necessary for the achievement of the aforementioned superior laser characteristics. These compositions all have the same basic crystal structure, similar physical properties and are growable as single crystals by generally similar techniques. The compositions are lanthanum oxysulfide, yttrium oxysulfide, gadolinium oxysulfide and lutetium oxysulfide and mixtures thereof. To achieve optimum performance, a specific amount of neodymium is added prior to or during growth, the neodymium replacing a certain percentage of the host metal (e.g., lanthanum) and substituting directly for that ion in the oxysulfide structure. Typically the useful range of neodymium substitution can vary from 0.01 percent replacement of the host metal ions to as much as 10 percent replacement although optimum performance is achieved for neodymium substitution in the range from 0.2 to 3 percent.

BRIEF DESCRIPTION OF THE DRAWING

The invention may be more easily understood from the following description and accompanying drawing in which.

DESCRIPTION OF THE PREFERRED EMBODIMENTS

Figure 1:
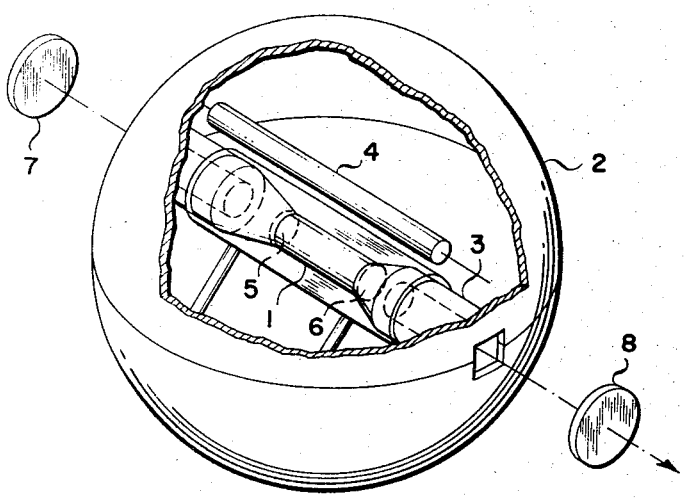
FIG. 1 is a perspective view, partially broken away to show the interior structure, of an apparatus utilizing the composition of the invention.

Referring more particularly to FIG. 1, there is shown a typical laser device. The laser rod 1, fabricated from an oriented single crystal having the composition as disclosed herein, is mounted within a spherical pumping cavity 2. Cooling of the rod, as necessary, is provided by a cooling water jacket, 3, the walls of which are transparent to the pump radiation. The pumping lamp, 4, is positioned near the laser rod and is imaged on the laser rod by the inner spherical mirror surface of the pumping cavity. In this way the maximum amount of pumping radiation is delivered to the laser rod. The ends of the rod, 5, 6, are polished to yield flat surfaces parallel to each other. These surfaces may be antireflection coated at the laser wavelength to decrease losses of the laser radiation emitted. The optical cavity is formed by the external mirrors, 7, 8, at least one of which is made only partially reflecting in order to allow the escape of the desired laser radiation. In other versions of the device, the ends of the rod might themselves be made reflecting to form an optical cavity internal to the rod. Likewise other cavities and configurations can be substituted.

Figure 2:
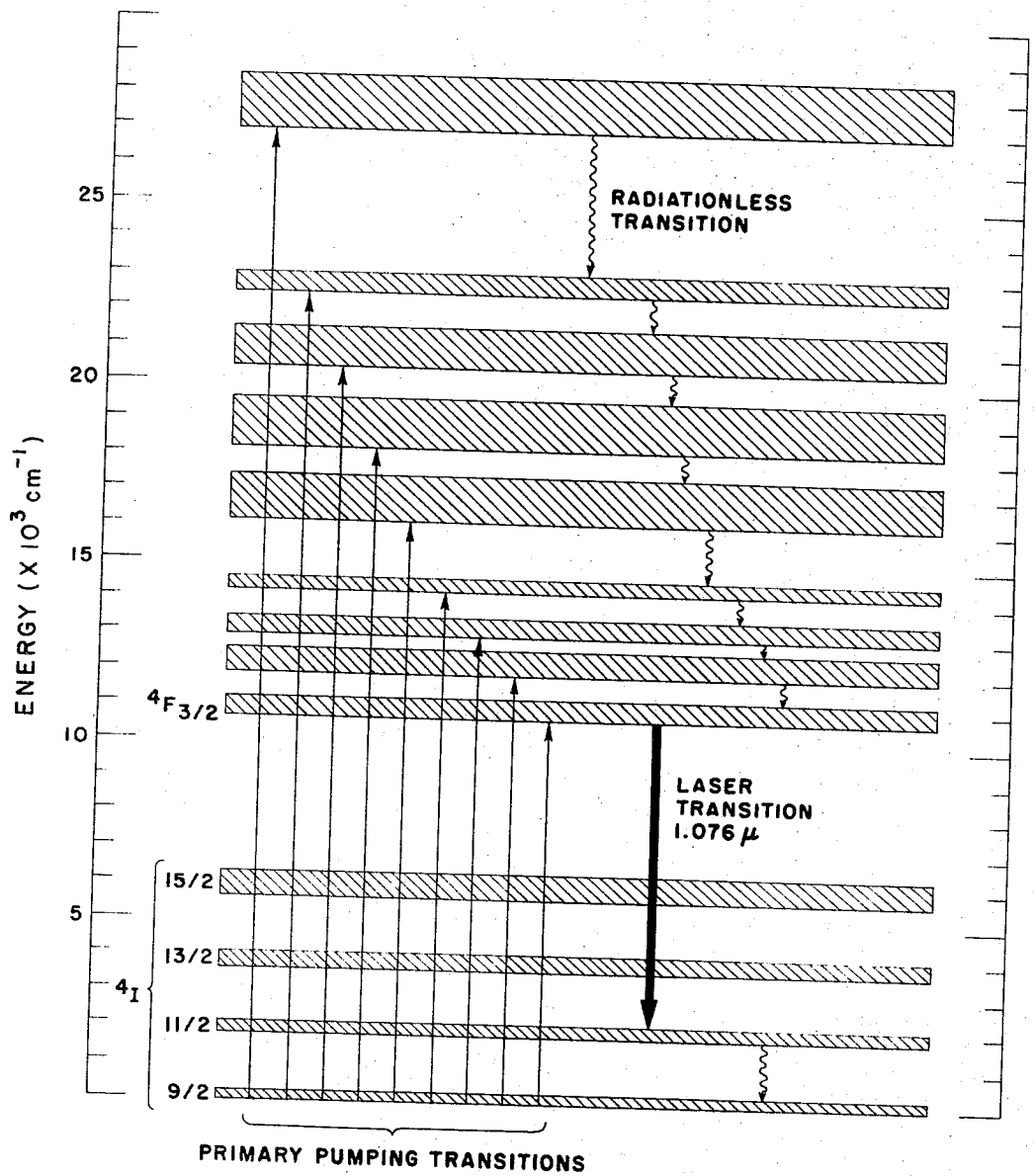
FIG. 2, an energy level diagram of the energy levels of the neodymium ion in lanthanum oxysulfide, shows the primary pumping transitions, the radiationless transitions and the laser transition of neodymium in this host material.

In FIG. 2 there are shown the energy levels of the neodymium ion in lanthanum oxysulfide. Pumping is accomplished either via host absorption in the ultraviolet or via the neodymium absorption indicated by the upward arrows. Nonradiative relaxation, indicated by the wiggly arrows, then takes place leading to the production of an excess population in one of the electronic energy levels of the $^4F_{3/2}$ state of the neodymium ion. The laser transition occurs between this state and one of the levels of the $^4I_{11/2}$ state of neodymium. Since this latter state is approximately 2000 cm$^{-1}$ above the ground state, the population inversion necessary to laser action is relatively easy to produce at room temperature. After the laser transition occurs, the neodymium ion relaxes non-radiatively to the ground state. A similar energy level diagram applies to the neodymium ion in the other oxysulfide host crystals of the invention.

Figure 3:
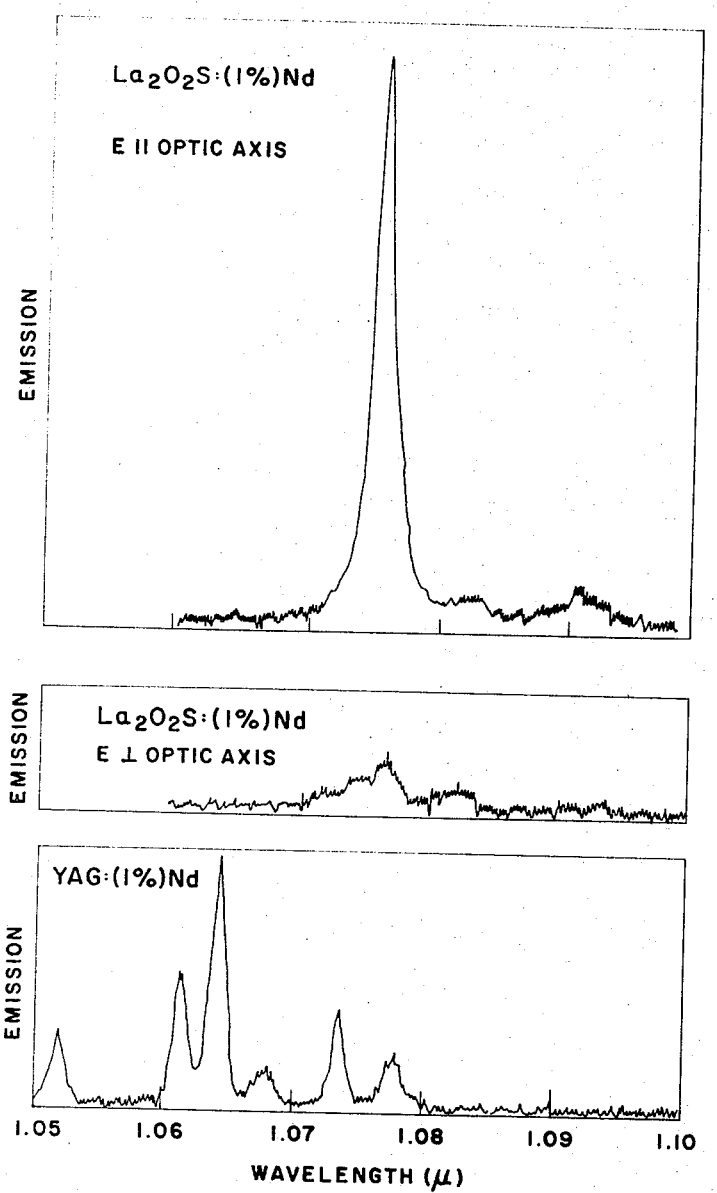
FIG. 3, on coordinates of relative emission intensity and wavelength in angstroms, is a plot showing the emission spectrum, utilizing a tungsten lamp as the pumping sources of the neodymium ion in lanthanum oxysulfide as compared to the neodymium ion in yttrium aluminum garnet.

In FIG. 3 there is shown a plot of the fluorescence of the neodymium ion in lanthanum oxysulfide as compared with that in YAG. The neodymium concentration is one atom percent replacement of lanthanum and yttrium neodymium. This corresponds to a neodymium concentration of approximately 2 × 10$^{20}$ neodymium ions per cubic centimeter. For the material of the invention, it is seen that the majority of the fluorescent emission in the region shown occurs in one line at a wavelength of approximately 1.076 microns, this emission being strongly polarized such that the maximum intensity occurs for the electric field vector of the emitted radiation parallel to the optic axis or c-axis of the crystal. This emission spectrum is exemplary of that for neodymium in yttrium oxysulfide, gadolinium oxysulfide and lutetium oxysulfide, although the exact wavelengths of emission will vary somewhat with the host oxysulfide. For example, the principle neodymium transition occurs at 1.078 microns in $Gd_2O_2S:Nd$, 1.079 microns in $Y_2O_2S:Nd$ and 1.081 microns in $Lu_2O_2S:Nd$. The $La_2O_2S:Nd$ line at 1.076 microns corresponds to the transition for which a downward arrow is shown in FIG. 2. For the neodymium - YAG composition, it is seen that fluorescent emission does not primarily occur in one line but rather over a range of wavelengths. To facilitate obtaining the emission spectra of this figure, a common relative emission intensity scale was utilized; accordingly, comparison in this figure between the intensities of YAG and the compositions of the invention are valid provided we ignore differences in losses resulting from differences in indices of refraction of the two materials. It is therefore seen that the YAG emission, which is further dissipated over a range of wavelengths, is not as intense as the emission exhibited by the compositions of the invention, which occurs primarily in one line.

Figure 4:
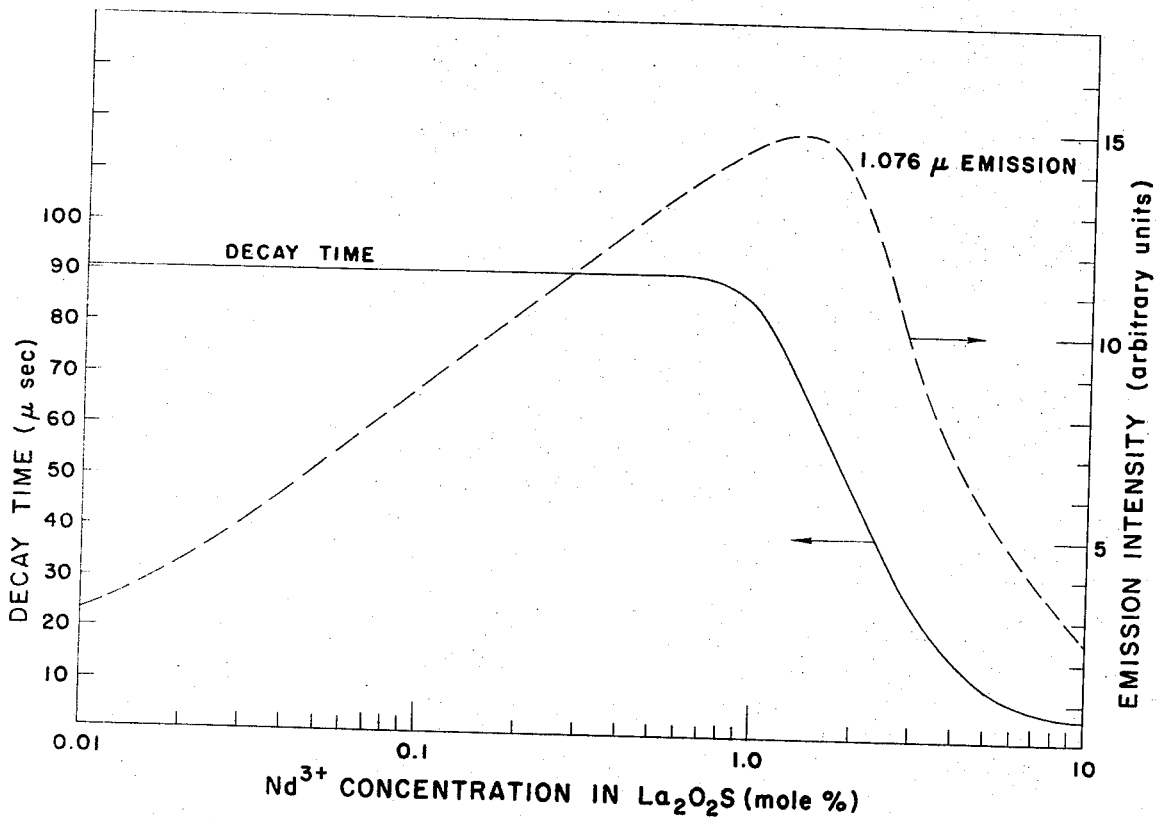
FIG. 4, on coordinates of decay time, emission intensity and neodymium concentration in lanthanum oxysulfide, is a semi-log plot showing the fluorescent emission intensity and fluorescent decay time for the laser transition for different concentrations of neodymium in lanthanum oxysulfide.

In FIG. 4 there is shown a typical plot of fluorescent emission intensity and fluorescent decay time for the laser transition for different concentrations of neodymium in lanthanum oxysulfide. As is seen, the intensity of emission peaks at about 1.5 atom percent replacement of lanthanum by neodymium. Above this concentration, quenching sets in and the output intensity drops with further increases in activator concentration. The fluorescent decay time also becomes shorter. Below the 1.5 percent substitution level, the intensity drops as the number of activator ions decreases but the decay time remains essentially constant. Similar curves are obtained for neodymium in other oxysulfide hosts, although the optimum concentration varies somewhat from host to host. For example, the optimum neodymium concentration in $Y_2O_2S:Nd$ and $Gd_2O_2S:Nd$ is about 0.5 percent while in $Lu_2O_2S:Nd$ the peak intensity occurs at about one percent.

The oxysulfide compositions of the invention are conveniently made in single crystalline form by techniques generally described as the Bridgeman or Stockbarger methods. The oxysulfides are first prepared as powders by one of several known techniques. The oxysulfide powders may themselves be of the final desired oxysulfide-neodymium composition, or, alternatively, the neodymium may be added to the host oxysulfide (lanthanum oxysulfide, yttrium oxysulfide, gadolinium oxysulfide or lutetium oxysulfide) separately in an amount designed to yield, upon melting and recrystallization, the desired final composition.

As discussed earlier, a 0.5 to 1.5 percent substitution of neodymium for the host metal ion appears to result in optimum laser performance for the several hosts of the invention. However, there are circumstances where higher or lower neodymium concentrations are more appropriate. It is sometimes necessary to trade off efficiency and low threshold operation in order to achieve high output power. This is done by using neodymium concentrations higher than the optimum value of 1.5 percent in order to increase the amount of pump radiation absorbed in the rod. On the other hand, when uniformity of pumping of the laser rod is desired it may be convenient to lower the concentration of neodymium to the point where less of the pump radiation is absorbed in the outer regions of the rod and more pump energy is delivered to the rod center. For these reasons a broader range of optimum activator concentrations of from 0.2 to 3 atom percent replacement of host metal ions is specified. As can be seen by reference to FIG. 4, the fluorescent emission intensity does not vary by more than a factor of two over this range. Of course, in principle, any concentration of neodymium can be achieved and fluorescence and laser action would be observed for many of these concentrations. Referring to FIG. 4, a practical lower concentration limit is 0.01 percent below when insufficient activator ions are present to allow efficient laser action, and a practical upper concentration limit is 10 percent above which the neodymium decay times have become too short and the emission too quenched to allow efficient laser action.

The starting powders are then loaded into a crucible from which the air is subsequently removed. At this point the crucible is sealed by electron beam welding the lid to the crucible body thus producing a closed container impervious to air and other gases. Typical crucibles, which have been used, are made from tungsten, are either 3 inches or 6 inches long, have a ½ inch inner diameter, are cylindrical but taper to a point over the bottom ½ inch of their length. Other crucible materials can be used provided the crucible material has the necessary chemical inertness in the presence of the molten oxysulfide and the necessary mechanical strength at the oxysulfide melting temperatures which are in the range from 2000° to 2300°C. The crucible, with its oxysulfide charge, is heated to this temperature. Once a melt has been attained, the crucible is either lowered physically through a temperature gradient or is held fixed in a gradient and the furnace temperature lowered. The intended result in either case is solidification of the entire melt as a single crystalline ingot starting at the bottom tip of the crucible. Cooling rates of 10°C to 20°C per hour have been used successfully. Once solidification has been achieved the crucible is lowered to room temperature and opend and the crystal is removed.

Other alternatives to this growth technique are possible. Melting, without decomposition or other degradation, has been achieved in an open iridium crucible under a pressure of 250 lbs/sq inch of argon. This indicates that crystal growth by the Czochralski technique (pulling from the melt using a seed crystal) is also feasi-ble in a pressurized furnace designed for such procedures. A number of furnace designs of this type exist.

The crystal, once removed from the crucible, is examined by either optical or x-ray techniques to determine the orientation of the optic axis. Since the crystal structure is uniaxial, there is a unique axis of symmetry. The absorption and emission lines of the neodymium ion are polarized relative to this axis of symmetry. It is therefore generally desirable to orient the axis of the laser rod relative to the axis of symmetry of the crystal. As can be seen from FIG. 3, the maximum laser intensity will be obtained, for example, from a laser rod whose axis is at right angles to the $c$-axis of the crystal.

Once the orientation of the crystal is determined and the decision on the orientation of the final laser rod has been made, the crystal is ground to the desired shape, typically though not necessarily cylindrical, and the rod ends are cut and polished. The rod ends are then, if desired, coated with an anti-reflection coating to improve laser performance. Once fabricated and coated the rod is then mounted in the pumping cavity as shown in FIG. 1. Cooling is supplied to the degree necessary. The external laser mirrors are aligned with each other to form the laser cavity and the rod axis is made parallel with the axis of the external mirror system. Pumping power is supplied by the pump lamp which may be either a tungsten lamp or a Xenon lamp or any other source having the desired power and a wavelength of emitted radiation suitable to match the absorption of the neodymium ion and host crystal. The pump radiation can either be supplied continuously or in pulses depending upon whether the laser is to be operated in a continuous or pulsed mode.

It should be recognized that a number of variations of this invention are possible. Other types of pumping could be used. Specific examples would include the pumping of the laser rod by first coating the surface with a cathodoluminescent layer of a phosphor having the desired wavelengths of emission and using electrons to excite this surface layer, the resulting radiation thence pumping the laser rod. Conversely, since the rare earth oxysulfides are typically themselves good cathode ray phosphors, the rod might itself be pumped directly by electrons. In both of these instances provisions would have to be made for conducting away the charge that would otherwise be built up in the rod as a result of the electron bombardment. Various semiconductor devices emitting in the visible and near infrared could also be used as sources of pump radiation.

As we have indicated there are a variety of variations on the host composition. There are four basic host compounds and since all four are closely related chemically and structurally, solid solutions of these, one with another, are also understood to be included in the invention. While the activator has been specifically limited to neodymium in the range from 0.01 to 10 atom percent replacement of the host metal ion, a range of coactivators and sensitizers could also be added. These would include other ions capable of absorbing additional pump energy and transferring this energy to the neodymium ion to enhance its emission efficiency. A number of multiply activated rare earth lasers are already known in the art. Chromium has been used for example as a sensitizer for neodymium. In the oxysulfides the rare earth ion praeseodymium is an efficient emitter in the visible and near infrared. It is excited efficiently by pumping in the near ultraviolet. When neodymium is added to an oxysulfide containing a small amount of praeseodymium, the praeseodymium emission is partially quenched, the energy being transferred to the neodymium. Host sensitization, that is, absorption of near ultraviolet radiation by the host with subsequent transfer to the neodymium, is also observed.

The laser can be fabricated in a wide range of geometries, cylindrical rods, slabs, rectangular solids, and the optical cavity can assume a variety of configurations including those where the laser rod has reflecting ends, becoming itself the laser cavity. Under these circumstances the ends may be flat or may assume curved shapes as well depending upon the type of cavity desired.

The laser can be used either as a source of laser radiation or, in conjunction with a second laser as an amplifier of laser radiation. It can be operated in a variety of ways to yield either $cw$, mode locked, pulsed or Q-switched performance. It is also possible by means of specially designed mirrors and cavity lengths to cause laser action at other wavelengths of neodymium emission, for example, in the 8960 A region of neodymium fluorescence, though the preferred wavelength is about 1.076 to 1.081 microns, depending upon the host used.

Specific examples of the device and compositions of the invention are given below. These examples are to be construed as illustrative only and not limiting in any measures the scope and spirit of the invention as defined by the appended claims.

EXAMPLE 1

A laser was made and operated using as the active medium single crystalline lanthanum oxysulfide in which about 1 percent of the lanthanum ions were replaced by neodymium ions. The crystal was fabricated into a cylindrical rod, the optic axis of the crystal being for convenience at right angles to the axis of the cylinder. The ends were ground and polished to be flat and parallel and were coated to give minimum reflectivity in the region around 1.07 microns. The rod when mounted as illustrated in FIG. 1, maintained at or near room temperature and pumped with a Xenon flash lamp produced intense coherent emission at about 1.076 microns. Using a 96.5 percent reflectivity output mirror, the $La_2O_2S$:Nd laser exhibited a threshold for laser action lower than a high quality neodymium-activated yttrium aluminum garnet laser rod of similar dimensions tested in the same cavity. Using a forty percent reflectivity output mirror, the $La_2O_2S$:Nd laser exhibited a threshold of less than half that of the above YAG laser. In addition it exhibited a slope efficiency greater than that of the high quality neodymium-activated yttrium aluminum garnet laser rod.

What is claimed is:

1. A single crystal laser material consisting essentially of at least one oxysulfide selected from the group consisting of lanthanum oxysulfide, yttrium oxysulfide, gadolinium oxysulfide and lutetium oxysulfide in which from about 0.01 percent to 10 percent of the host metal ions have been replaced by trivalent neodymium ions, the principal neodymium laser transition occuring at about 1.076 microns in $La_2O_2S$:Nd, 1.078 microns in $Gd_2O_2S$:Nd, 1.079 microns in $Y_2O_2S$:Nd and 1.081 microns in $Lu_2O_2S$:Nd and the maximum intensity of emitted radiation occurring for the electric field vector of emitted radiation parallel to the optic axis of the crystal.

2. A single crystal laser material in accordance with claim 1 wherein from about 0.2 percent to 3 percent of the host metal ions have been replaced by travelent neodymium ions.

3. A single crystal laser material in accordance with claim 1 wherein from about 0.5 percent to 1.5 percent of the host metal ions have been replaced by trivalent neodymium ions.

4. In an laser device, a laser rod consisting essentially of at least one single crystal oxysulfide material selected from the group consisting of lanthanum oxysulfide, yttrium oxysulfide, gadolinium oxysulfide and lutetium oxysulfide in which from about 0.01 percent to 10 percent of the host metal ions have been replaced by trivalent neodymium ions and pumping means to establish the population inversion state necessary to laser action.

5. An laser device in accordance with claim 4 wherein from about 0.2 percent to 3 percent of the host metal ions have been replaced by trivalent neodymium ions.

6. An laser device in accordance with claim 4 wherein from about 0.5 percent to 1.5 percent of the host metal ions have been replaced by trivalent neodymium ions.

* * * * *